United States Patent
Zhao et al.

(10) Patent No.: US 11,531,421 B2
(45) Date of Patent: Dec. 20, 2022

(54) THIN FILM TRANSISTOR ARRAY SUBSTRATE AND TOUCH DISPLAY PANEL HAVING VARYING NUMBER OF TOUCH TRACES PER TOUCH ELECTRODE

(71) Applicant: WUHAN CHINA STAR OPTOELECTRONICS TECHNOLOGY CO., LTD., Hubei (CN)

(72) Inventors: Mang Zhao, Hubei (CN); Yanyang Li, Hubei (CN); Yong Tian, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 46 days.

(21) Appl. No.: 17/260,154

(22) PCT Filed: Jun. 17, 2020

(86) PCT No.: PCT/CN2020/096641
§ 371 (c)(1),
(2) Date: Jan. 13, 2021

(87) PCT Pub. No.: WO2021/217817
PCT Pub. Date: Nov. 4, 2021

(65) Prior Publication Data
US 2022/0187954 A1    Jun. 16, 2022

(30) Foreign Application Priority Data

Apr. 30, 2020    (CN) .......................... 202010364438.3

(51) Int. Cl.
*G06F 3/041*    (2006.01)
*G06F 3/044*    (2006.01)
(Continued)

(52) U.S. Cl.
CPC ........ *G06F 3/04164* (2019.05); *G02F 1/1368* (2013.01); *G02F 1/13338* (2013.01);
(Continued)

(58) Field of Classification Search
CPC .. G06F 3/0446; G06F 3/0412; G06F 3/04164; G06F 3/0443; G02F 1/13338;
(Continued)

(56) References Cited

U.S. PATENT DOCUMENTS 10,635,231 B2 *   4/2020   Aoyama ............... G06F 3/0443
11,157,123 B2 *  10/2021   Kim ..................... G09G 3/3648
(Continued)

FOREIGN PATENT DOCUMENTS

CN    106249960 A    12/2016
CN    107340919 A    11/2017
(Continued)

OTHER PUBLICATIONS

International Search Report dated Jan. 26, 2021; PCT/CN2020/096641.

*Primary Examiner* — Darlene M Ritchie
(74) *Attorney, Agent, or Firm* — PV IP PC; Wei Te Chung; Ude Lu

(57) ABSTRACT

The present application provides a thin film transistor array substrate and a touch display panel including a plurality of touch electrodes, and the touch electrodes including a first touch electrode, a second touch electrode, and a third touch electrode arranged in a first direction. A number of touch trace electrically connected to the second touch electrode and the driver chip is greater than or equal to a number of touch trace electrically connected to the first touch electrode and the driver chip, and is less than a number of touch trace electrically connected to the third touch electrode and the driver chip.

6 Claims, 10 Drawing Sheets

(51) Int. Cl.
*G02F 1/1333* (2006.01)
*G02F 1/1343* (2006.01)
*G02F 1/1362* (2006.01)
*G02F 1/1368* (2006.01)
*G02F 1/1335* (2006.01)

(52) U.S. Cl.
CPC .. *G02F 1/134336* (2013.01); *G02F 1/136227* (2013.01); *G02F 1/136286* (2013.01); *G06F 3/0412* (2013.01); *G06F 3/0443* (2019.05); *G06F 3/0446* (2019.05); *G02F 1/133514* (2013.01); *G06F 3/0416* (2013.01)

(58) Field of Classification Search
CPC ......... G02F 1/134336; G02F 1/136227; G02F 1/136286; G02F 1/1368; G02F 1/133514
See application file for complete search history.

(56) References Cited

U.S. PATENT DOCUMENTS

| | | | |
|---|---|---|---|
| 2012/0218199 A1* | 8/2012 | Kim | G02F 1/13338 345/173 |
| 2017/0060310 A1* | 3/2017 | Gwon | G09G 3/3677 |
| 2017/0357378 A1* | 12/2017 | Yao | G06F 3/0443 |
| 2018/0321770 A1 | 11/2018 | Zhou et al. | |
| 2019/0250762 A1* | 8/2019 | Aoyama | G06F 3/0443 |
| 2021/0278921 A1* | 9/2021 | Morinaga | G06F 3/044 |
| 2021/0318773 A1* | 10/2021 | Kim | G06F 3/0443 |
| 2022/0155892 A1* | 5/2022 | Noguchi | G06F 3/0412 345/173 |

FOREIGN PATENT DOCUMENTS

| | | |
|---|---|---|
| CN | 107608560 A | 1/2018 |
| CN | 108874227 A | 11/2018 |
| CN | 110764653 A | 2/2020 |
| CN | 211698914 U | 10/2020 |

* cited by examiner

THIN FILM TRANSISTOR ARRAY SUBSTRATE AND TOUCH DISPLAY PANEL HAVING VARYING NUMBER OF TOUCH TRACES PER TOUCH ELECTRODE

CROSS REFERENCE TO RELATED APPLICATIONS

The present application claims priority to Chinese Patent Application No. 202010364438.3, titled "THIN FILM TRANSISTOR ARRAY SUBSTRATE AND TOUCH DISPLAY PANEL" filed on Apr. 30, 2020 with the China National Intellectual Property Administration, which is incorporated by reference in the present application in its entirety.

FIELD OF INVENTION

The present disclosure relates to the field of display technology, and particularly to a thin film transistor array substrate and a touch display panel.

BACKGROUND

With development of touch display technology, in-cell touch display panels are increasingly applied to electronic display devices such as mobile phones. Because the in-cell touch display panel integrates touch functions and display functions, touch circuits and display circuits are both built on a thin film transistor array substrate (TFT array substrate), which is advantageous for improving a penetration degree and is able to make electronic display devices such as mobile phones thinner and lighter.

The touch functions of the in-cell touch display panel are completed by touch electrodes integrated in the thin film transistor array substrate and touch traces and driver chips electrically connected to the touch electrodes. Wherein, the touch electrodes are electrically connected to a common electrode in the thin film transistor array substrate. Therefore, a voltage change of the touch electrode will directly affect a voltage state of the common electrode, thereby affecting the display function of the display panel. A common power line and the driver chips are respectively electrically connected to the touch electrodes through the touch traces, so as to realize voltage transmission and signal collection of the touch electrodes. However, considering a limited number of channels used to connect the touch traces in the driver chips and an impact of a number of touch traces on a resolution of the panel, it is usually not guaranteed in actual production that each touch electrode is connected to the same number of touch traces. The number of touch traces connected to the touch electrodes has a direct impact on the voltage state on the touch electrodes, which in turn affects consistency of voltage distribution on the common electrode, causing the display panel to have problems such as upper and lower split screens and uneven display.

Therefore, in the thin film transistor array substrate, the number of touch traces connected to the touch electrodes has a direct effect on the voltage state of the touch electrodes and the common electrode connected to the touch electrodes. The large difference between the number of touch traces connected to different touch electrodes will have an adverse effect on the consistency of the voltage distribution on the common electrode, and will easily cause the display panel to have the problems of upper and lower split screens and uneven display.

SUMMARY OF DISCLOSURE

In order to solve the above technical problems, the solutions provided by this application are as follows:

A thin film transistor array substrate is provided, comprising:

a substrate comprising a non-display area;

a thin film transistor array layer disposed on the substrate; and a touch function layer disposed in the thin film transistor array layer, comprising a plurality of touch electrodes, wherein each of the touch electrodes is electrically connected to a first common power line and a driver chip through at least one touch trace;

wherein the plurality of touch electrodes comprise a first touch electrode, a second touch electrode, and a third touch electrode arranged along a first direction, the number of the touch trace electrically connected to the second touch electrode and the driver chip is greater than or equal to the number of the touch trace electrically connected to the first touch electrode and the driver chip, and the number of the touch trace electrically connected to the second touch electrode and the driver chip is less than the number of the touch trace electrically connected to the third touch electrode and the driver chip; or the number of the touch trace electrically connected to the second touch electrode and the driver chip is less than the number of the touch trace electrically connected to the first touch electrode and the driver chip, and the number of the touch trace electrically connected to the second touch electrode and the driver chip is greater than or equal to the number of the touch trace electrically connected to the third touch electrode and the driver chip.

In the thin film transistor array substrate of the present application, wherein the number of the touch trace electrically connected to the second touch electrode and the first common power line is greater than the number of the touch trace electrically connected to the first touch electrode and the first common power line, and the number of the touch trace electrically connected to the second touch electrode and the first common power line is less than or equal to the number of the touch trace electrically connected to the third touch electrode and the first common power line; or the number of the touch trace electrically connected to the second touch electrode and the first common power line is less than or equal to the number of the touch trace electrically connected to the first touch electrode and the first common power line, and the number of the touch trace electrically connected to the second touch electrode and the first common power line is greater than the number of the touch trace electrically connected to the third touch electrode and the first common power line.

In the thin film transistor array substrate of the present application, wherein the number of the touch trace electrically connected to the second touch electrode and the driver chip is greater than or equal to the number of the touch trace electrically connected to the first touch electrode and the driver chip, and the number of the touch trace electrically connected to the second touch electrode and the driver chip is less than the number of the touch trace electrically connected to the third touch electrode and the driver chip; and the number of the touch trace electrically connected to the second touch electrode and the first common power line is less than or equal to the number of the touch trace electrically connected to the first touch electrode and the first common power line, and the number of the touch trace electrically connected to the second touch electrode and the first common power line is greater than the number of the touch trace electrically connected to the third touch electrode and the first common power line.

In the thin film transistor array substrate of the present application, wherein the first touch electrode and the second touch electrode are arranged adjacent to each other along the first direction, the number of touch trace electrically connected to the second touch electrode and the driver chips is equal to the number of touch trace electrically connected to the first touch electrode and the driver chip, and the number of the touch traces electrically connected to the second touch electrode and the first common power line is greater than the number of the touch trace electrically connected to the first touch electrode and the first common power line.

In the thin film transistor array substrate of the present application, wherein the second touch electrode and the third touch electrode are arranged adjacent to each other along the first direction, the number of touch trace electrically connected to the second touch electrode and the driver chip is less than the number of touch trace electrically connected to the third touch electrode and the driver chip, and the number of the touch traces electrically connected to the second touch electrode and the first common power line is equal to the number of the touch trace electrically connected to the third touch electrode and the first common power line.

In the thin film transistor array substrate of the present application, wherein the first touch electrode, the second touch electrode, and the third touch electrode are sequentially arranged adjacent to each other along the first direction;

wherein the number of the touch trace electrically connected to the second touch electrode and the driver chip is equal to the number of the touch trace electrically connected to the first touch electrode and the driver chip, and the number of touch trace electrically connected to the second touch electrode and the first common power line is greater than the number of the touch traces electrically connected to the first touch electrode and the first common power line; and wherein the number of the touch trace electrically connected to the second touch electrode and the driver chip is less than the number of the touch trace electrically connected to the third touch electrode and the driver chip, and the number of touch trace electrically connected to the second touch electrode and the first common power line is equal to the number of the touch traces electrically connected to the third touch electrode and the first common power line.

In the thin film transistor array substrate of the present application, wherein the number of the touch trace electrically connected to the second touch electrode and the driver chip is greater than or equal to the number of touch traces electrically connected to the third touch electrode and the driver chip, and the number of touch trace electrically connected to the second touch electrode and the driver chip is less than the number of the touch trace electrically connected to the first touch electrode and the driver chip; and the number of the touch trace electrically connected to the second touch electrode and the first common power line is less than or equal to the number of the touch trace electrically connected to the first touch electrode and the first common power line, and the number of the touch trace electrically connected to the second touch electrode and the first common power line is greater than the number of the touch trace electrically connected to the third touch electrode and the first common power line.

In the thin film transistor array substrate of the present application, wherein the first touch electrode and the second touch electrode are arranged adjacent to each other along the first direction, the number of touch trace electrically connected to the second touch electrode and the driver chips is less than the number of touch traces electrically connected to the first touch electrode and the driver chip, and the number of the touch trace electrically connected to the second touch electrode and the first common power line is equal to the number of the touch trace electrically connected to the first touch electrode and the first common power line.

In the thin film transistor array substrate of the present application, wherein the second touch electrode and the third touch electrode are arranged adjacent to each other along the first direction, and the number of touch trace electrically connected to the second touch electrode and the driver chips is equal to the number of the touch trace electrically connected to the third touch electrode and the driver chip, and the number of the touch trace electrically connected to the second touch electrode and the first common power line is greater than the number of the touch trace electrically connected to the third touch electrode and the first common power line.

In the thin film transistor array substrate of the present application, wherein the first touch electrode, the second touch electrode, and the third touch electrode are sequentially arranged adjacent to each other along the first direction;

wherein the number of the touch trace electrically connected to the second touch electrode and the driver chip is less than the number of touch trace electrically connected to the first touch electrode and the driver chip, and the number of touch traces electrically connected to the second touch electrode and the first common power line is equal to the number of the touch trace electrically connected to the first touch electrode and the first common power line; and wherein the number of the touch trace electrically connected to the second touch electrode and the driver chip is equal to the number of the touch trace electrically connected to the third touch electrode and the driver chip, and the number of touch trace electrically connected to the second touch electrode and the first common power line is greater than number of the touch trace electrically connected to the third touch electrode and the first common power line.

In the thin film transistor array substrate of the present application, wherein the touch electrode further comprises a fourth touch electrode disposed between the second touch electrode and the driver chip along the first direction, a dummy trace is disposed on the fourth touch electrode, and the dummy trace is electrically connected to the fourth touch electrode.

In the thin film transistor array substrate of the present application, wherein the sum of the number of the dummy trace disposed on the fourth touch electrode and the number of the touch trace electrically connected to the second touch electrode of the driver chip is greater than the number of the touch trace electrically connected to the first touch electrode and the driver chip, and is less than or equal to the number of the touch trace electrically connected to the third touch electrode and the driver chip; or the sum of the number of the dummy trace disposed on the fourth touch electrode and the number of the touch trace electrically connected to the second touch electrode of the driver chip is less than or equal to the number of the touch trace electrically connected to the first touch electrode and the driver chip, and is greater than the number of the touch trace electrically connected to the third touch electrode and the driver chip.

In the thin film transistor array substrate of the present application, wherein a dummy trace is disposed between the second touch electrode and the driver chip, and one end of the dummy trace is electrically connected to the second touch electrode;

the sum of the number of the dummy trace and the number of the touch trace electrically connected to the second touch electrode of the driver chip is greater than the number of the touch trace electrically connected to the first touch electrode and the driver chip, and is less than or equal to the number of the touch trace electrically connected to the third touch electrode and the driver chip; or the sum of the number of the dummy trace and the number of the touch trace electrically connected to the second touch electrode of the driver chip is less than or equal to the number of the touch trace electrically connected to the first touch electrode and the driver chip, and is greater than the number of the touch trace electrically connected to the third touch electrode and the driver chip.

In the thin film transistor array substrate of the present application, wherein the thin film transistor array layer comprises an active layer disposed on the substrate, a gate insulating layer disposed on the active layer, a gate electrode disposed on the gate insulating layer, an interlayer insulating layer disposed on the gate electrode, and source/drain electrodes disposed on the interlayer insulating layer;

wherein a first insulating layer is disposed on the source/drain electrodes, a common electrode is disposed on the first insulating layer, a second insulating layer is disposed on the common electrode, and a pixel electrode is disposed on the second insulating layer; and wherein the common electrode is electrically connected to the touch electrode through the via holes in the first insulating layer, and the pixel electrode is electrically connected to the source/drain electrodes through the via holes in the first insulating layer and the second insulating layer.

In the thin film transistor array substrate of the present application, wherein the first common power line and the driver chip are both disposed in the non-display area, and are disposed on opposite ends of the touch function layer along the first direction.

In the thin film transistor array substrate of the present application, wherein a second common power line is further disposed on the same side of the driver chip, and the touch traces electrically connecting the touch electrodes and the driver chip are electrically connected to the second common power line at the same time.

In the thin film transistor array substrate of the present application, wherein a first switching transistor is provided on a touch trace connecting the touch electrode and the first common power line, and a second switch transistor is provided on the touch trace connecting the second common power line and the touch electrode.

The present application further provides a touch display panel, comprising a thin film transistor array substrate, wherein thin film transistor array substrate comprises:

a substrate comprising a non-display area;

a thin film transistor array layer disposed on the substrate; and a touch function layer disposed in the thin film transistor array layer, comprising a plurality of touch electrodes, wherein each of the touch electrodes is electrically connected to a first common power line and a driver chip through at least one touch trace;

wherein the plurality of touch electrodes comprise a first touch electrode, a second touch electrode, and a third touch electrode arranged along a first direction, the number of the touch trace electrically connected to the second touch electrode and the driver chip is greater than or equal to the number of the touch trace electrically connected to the first touch electrode and the driver chip, and the number of the touch trace electrically connected to the second touch electrode and the driver chip is less than the number of the touch trace electrically connected to the third touch electrode and the driver chip; or the number of the touch trace electrically connected to the second touch electrode and the driver chip is less than the number of the touch trace electrically connected to the first touch electrode and the driver chip, and the number of the touch trace electrically connected to the second touch electrode and the driver chip is greater than or equal to the number of the touch trace electrically connected to the third touch electrode and the driver chip.

In the touch display panel of the present application, the touch display panel further comprises a color filter substrate disposed opposite to the thin film transistor array substrate, and liquid crystals disposed between the color filter substrate and the thin film transistor array substrate.

The present application further provides a touch display panel, comprising a thin film transistor array substrate, a color filter substrate disposed opposite to the thin film transistor array substrate, and liquid crystals disposed between the thin film transistor array substrate and the color filter substrate;

wherein thin film transistor array substrate comprises:

a substrate comprising a non-display area;

a thin film transistor array layer disposed on the substrate; and a touch function layer disposed in the thin film transistor array layer, comprising a plurality of touch electrodes, wherein each of the touch electrodes is electrically connected to a first common power line and a driver chip through at least one touch trace;

the plurality of touch electrodes comprise a first touch electrode, a second touch electrode, and a third touch electrode arranged along a first direction, wherein the number of the touch trace electrically connected to the second touch electrode and the driver chip is greater than or equal to the number of the touch trace electrically connected to the first touch electrode and the driver chip, the number of the touch trace electrically connected to the second touch electrode and the driver chip is less than the number of the touch trace electrically connected to the third touch electrode and the driver chip, the number of the touch trace electrically connected to the second touch electrode and the first common power line is greater than the number of the touch trace electrically connected to the first touch electrode and the first common power line, and the number of the touch trace electrically connected to the second touch electrode and the first common power line is less than or equal to the number of the touch trace electrically connected to the third touch electrode and the first common power line; or the number of the touch trace electrically connected to the second touch electrode and the driver chip is less than the number of the touch trace electrically connected to the first touch electrode and the driver chip, the number of the touch trace electrically connected to the second touch electrode and the driver chip is greater than or equal to the number of the touch trace electrically connected to the third touch electrode and the driver chip, the number of the touch trace electrically connected to the second touch electrode and the first common power line is less than or equal to the number of the touch trace electrically connected to the first touch electrode and the first common power line, and the number of the touch trace electrically connected to the second touch electrode and the first common power line is greater than the number of the touch trace electrically connected to the third touch electrode and the first common power line.

The present application has advantages of rationally configuring the number of touch traces that are electrically connected to the touch electrode and the first common power line and the driver chip to eliminate or reduce abrupt voltage changes caused by the difference in the number of touch electrodes connected to the first common power line and the number of touch traces of the driver chip, and makes the voltage distribution on the touch electrode and the common electrode in the thin film transistor array substrate tend to be consistent, thereby improving the display quality of the display panel.

BRIEF DESCRIPTION OF DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
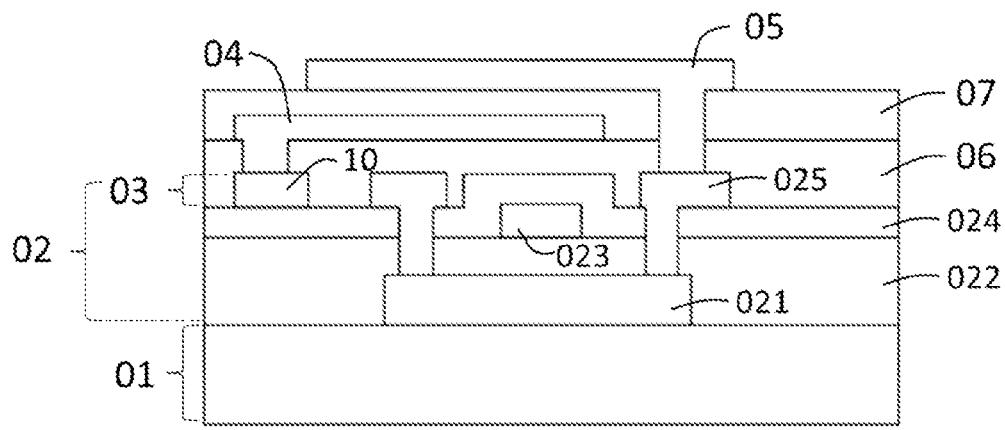
FIG. 1 is a schematic partial cross-sectional view of a thin film transistor array substrate provided by an embodiment of the present application.

The description of the following embodiments refers to the attached drawings to illustrate specific embodiments that can be implemented in this application. The directional terms mentioned in this application, such as top, bottom, front, back, left, right, inner, outer, side, etc., are for reference only The direction of the additional schema. Therefore, the directional terms used are used to illustrate and understand the application, rather than to limit the application. In the figure, units with similar structures are indicated by the same reference numerals.

Embodiments of the present application provide a thin film transistor array substrate comprising a plurality of touch electrodes, wherein each of the touch electrodes is electrically connected to a first common power line and a driver chip through a touch trace. The embodiments of the present application rationally configure the number of the touch trace electrically connected to the touch electrode and the driver chip to eliminate or reduce abrupt voltage changes caused by the difference in the number of touch electrodes connected to the first common power line and the driver chip, and makes the voltage distribution on the touch electrode and the common electrode in the thin film transistor array substrate tend to be consistent, thereby improving the display quality of the display panel.

Figure 2:
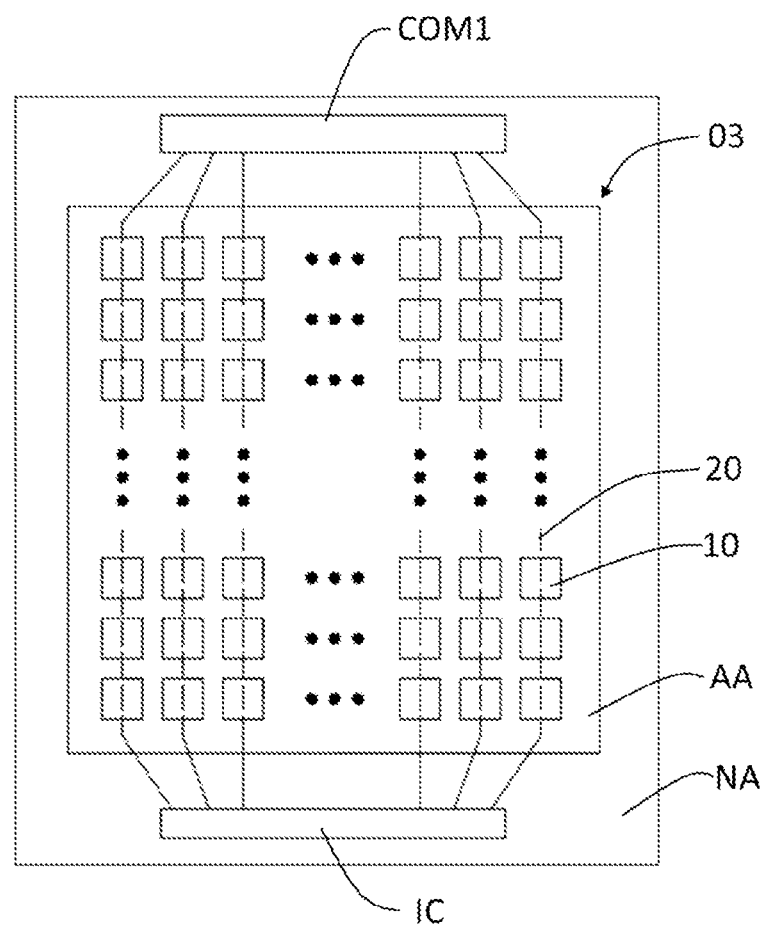
FIG. 2 is a top view of a thin film transistor array substrate provided by an embodiment of the application.

As shown in FIG. 1 and FIG. 2, FIG. 1 is a schematic partial cross-sectional view of a thin film transistor array substrate provided by an embodiment of the present application, and FIG. 2 is a top view of the thin film transistor array substrate provided by an embodiment of the present application. The thin film transistor array substrate comprises a substrate 01, a thin film transistor array layer 02 disposed on the substrate 01, and a common electrode 04 and a pixel electrode 05 disposed on the thin film transistor array layer 02. The thin film transistor array substrate further comprises a touch function layer 03 disposed in the thin film transistor array layer 02, and the touch function layer 03 is configured to realize the touch function of the thin film transistor array substrate.

Optionally, the thin film transistor array layer 02 comprises an active layer 021 disposed on the substrate 01, a gate insulating layer 022 disposed on the active layer 021, and a gate electrode 023 disposed on the gate insulating layer 022, an interlayer insulating layer 024 disposed on the gate electrode 023, and source/drain electrodes 025 disposed on the interlayer insulating layer 024. A touch electrode 10 and the source/drain electrodes 025 are disposed on the same level. A first insulating layer 06 is disposed between the thin film transistor array layer 02 and the common electrode 04, and a second insulating layer 07 is disposed between the common electrode 04 and the pixel electrode 05. The pixel electrode 05 electrically connects the source/drain electrodes 025 through via holes in the first insulating layer 06 and the second insulating layer 07, so as to realize signal transmission from the thin film transistor layer 02 to the pixel electrode 05. The common electrode 04 is electrically connected to the touch electrode 10 through the via hole in the first insulating layer 06.

Further, the touch function layer 03 comprises a plurality of touch electrodes 10. The substrate 01 has a display area AA and a non-display area NA, and a first common power line COM1 and a driver chip IC are disposed at a position corresponding to the non-display area NA. Each of the touch electrodes 10 is connected to the first common power line COM1 and the driver chip IC through a touch trace 20, wherein the first common power line COM1 is configured to provide a common voltage signal to the touch electrode 10. The driver chip IC is configured to provide voltage signals to the touch electrodes 10 and perform signal collection and analysis. Optionally, the first common power line COM1 and the driver chip IC are respectively disposed at opposite ends of the touch function layer 03, so that voltage signals are provided to the touch electrode 10 from both ends at the same time.

Figure 3:
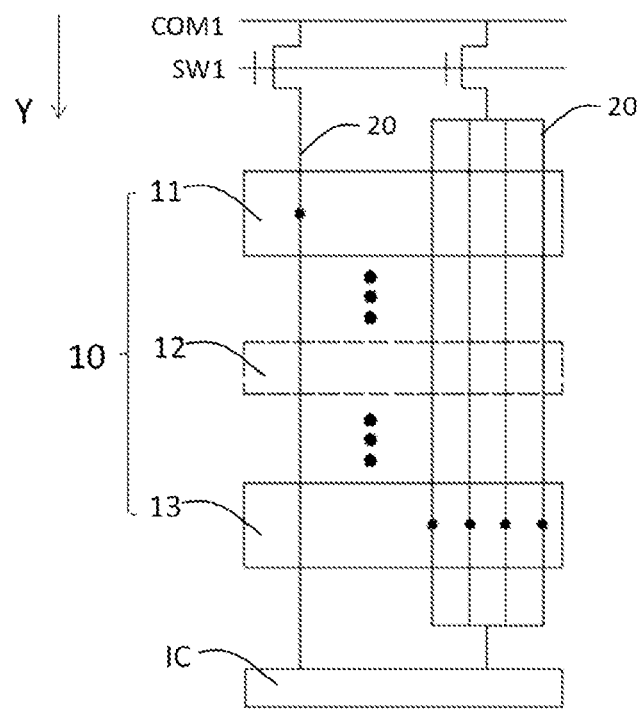
FIG. 3 is a schematic diagram of a first wiring method of a touch trace electrically connected to a touch electrode and a first common power line and a driver chip provided by an embodiment of the present application.
Figure 4:
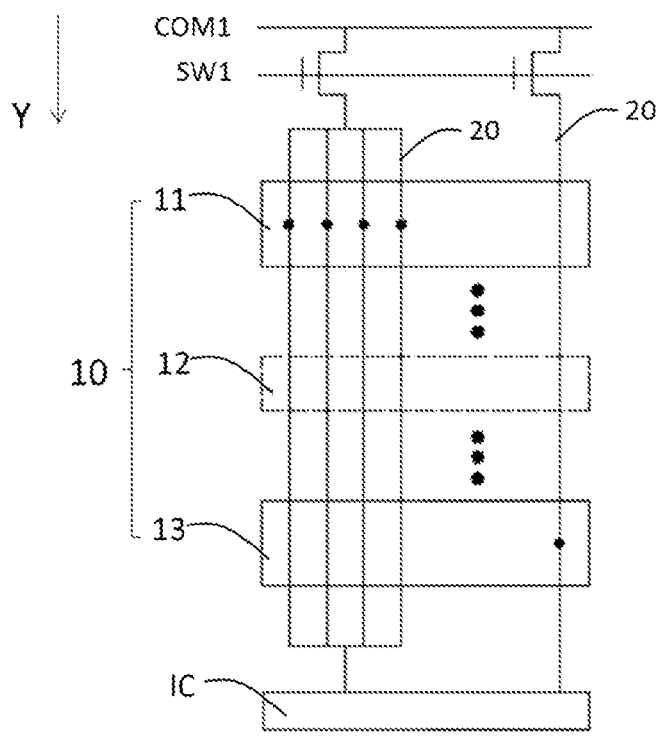
FIG. 4 is a schematic diagram of a second wiring method of the touch trace electrically connected to the touch electrode and the first common power line and the driver chip provided by an embodiment of the present application.

As shown in FIGS. 3, 4, 5a to 5f, 6a to 6f, and 7a to 7f, wherein FIG. 3 is a schematic diagram of a first wiring method of a touch trace electrically connected to a touch electrode and a first common power line and a driver chip provided by an embodiment of the present application, and FIG. 4 is a schematic diagram of a second wiring method of the touch trace electrically connected to the touch electrode and the first common power line and the driver chip provided by an embodiment of the present application. FIGS. 5a to 5f are schematic diagrams of six alternative wiring methods of the first embodiment of the touch trace electrically connected to the second touch electrode and the first common power line and the driver chip. FIGS. 6a to 6f are schematic diagrams of six alternative wiring methods of the second embodiment of the touch trace electrically connected to the second touch electrode and the first common power line and the driver chip. FIGS. 7a to 7f are schematic diagrams of six alternative wiring methods of the third embodiment of the touch trace electrically connected to the second touch electrode and the first common power line and the driver chip.

Optionally, the touch trace 20 is electrically connected to the first common power line COM1 and the touch electrode 10 through a first switch transistor SW1, and the first switch transistor SW1 is configured to control the electrical conduction state between the first common power line COM1 and the touch electrode 10.

The plurality of touch electrodes 10 comprises a first touch electrode 11, a second touch electrode 12, and a third touch electrode 13 arranged along a first direction Y.

According to an embodiment of the present application, referring to FIGS. 3, 5a to 5f, 6a to 6f, and 7a to 7f, the number of the touch trace 20 electrically connected to the second touch electrode 12 and the driver chip IC is greater than or equal to the number of the touch trace 20 electrically connected to the first touch electrode 11 and the driver chip IC, and the number of the touch trace 20 electrically connected to the second touch electrode 12 and the driver chip IC is less than or equal to the number of the touch trace 20 electrically connected the third touch electrode 13 and the driver chip IC. It should be noted that the driver chip IC transmits voltage signals and performs signal collection and analysis to the touch electrode 10 through the touch traces 20, and the number of the touch trace 20 electrically connected to the touch electrode 10 and the driver chip IC directly affects the voltage state on the touch electrode 10. In actual production, considering the number of channels of the driver chip IC and the resolution rate of the display panel, the number of touch traces connecting different touch electrodes may be different. In the present embodiment, through rationally configuring the number of touch traces that are electrically connected to the touch electrode and the driver chip, stepwise changes are realized in the number of touch traces 20 connected to the first touch electrode 11, the second touch electrode 12, and the third touch electrode 13, thereby preventing sudden changes in the number of touch traces connected to different touch electrodes, which will seriously damage the consistency of the voltage distribution on the touch electrodes and the common electrode. The present embodiment is beneficial to promote the voltage distribution on the touch electrode and the common electrode in the thin film transistor array substrate to be consistent.

Further, the number of the touch trace 20 electrically connected to the second touch electrode 12 and the first common power line COM1 is greater than the number of the touch trace 20 electrically connected to the first touch electrode 11 and the first common power line COM1, and the number of the touch trace 20 electrically connected to the second touch electrode 12 and the first common power line COM1 is less than or equal to the number of the touch trace 20 electrically connected to the third touch electrode 13 and the first common power line COM1. It should be noted that the number of the touch trace 20 electrically connected to the touch electrode 10 and the first common power line COM1 directly affects the voltage state on the touch electrode 10. In the present embodiment, through rationally configuring the number of touch traces that are electrically connected to the touch electrode and the first common power line, step-wise changes are realized in the number of touch traces 20 connected to the first touch electrode 11, the second touch electrode 12, and the third touch electrode 13, thereby preventing sudden changes in the number of touch traces connected to different touch electrodes, which will seriously damage the consistency of the voltage distribution on the touch electrodes and the common electrode. The present embodiment is beneficial to promote the voltage distribution on the touch electrode and the common electrode in the thin film transistor array substrate to be consistent.

It should be noted that, regarding wiring methods of the touch traces 20 electrically connected to the second touch electrode 12 and the first common power line COM1, and the second touch electrode 12 and the driver chip IC, the present embodiment provides six different wiring methods of the first embodiment shown in FIGS. 5a to 5f, six different wiring methods of the second embodiment shown in FIGS. 6a to 6f, and six different wiring methods of the third embodiment as shown in FIG. 7a to FIG. 7f. During operations, one or more of the eighteen different wiring methods in the three embodiments can be flexibly applied.

Figure 5A:
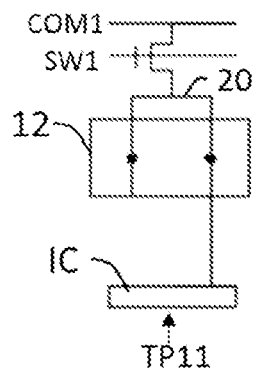
FIG. 5a is a schematic diagram of a first wiring method of a first embodiment of a touch trace electrically connected to a second touch electrode and the first common power line and the driver chip.
Figure 5B:
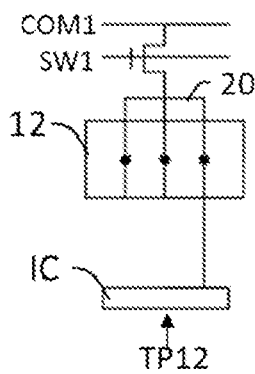
FIG. 5b is a schematic diagram of a second wiring method of the first embodiment of the touch trace electrically connected to the second touch electrode and the first common power line and the driver chip.
Figure 5C:
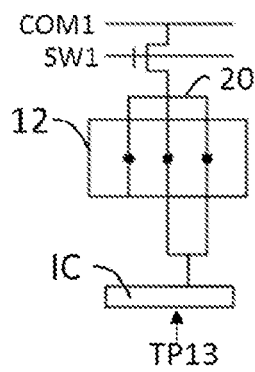
FIG. 5c is a schematic diagram of a third wiring method of the first embodiment of the touch trace electrically connected to the second touch electrode and the first common power line and the driver chip.
Figure 5D:
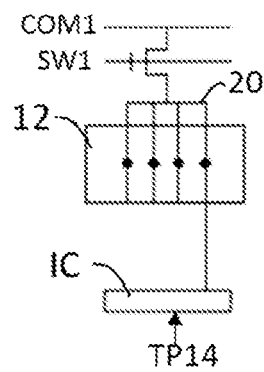
FIG. 5d is a schematic diagram of a fourth wiring method of the first embodiment of the touch trace electrically connected to the second touch electrode and the first common power line and the driver chip.
Figure 5E:
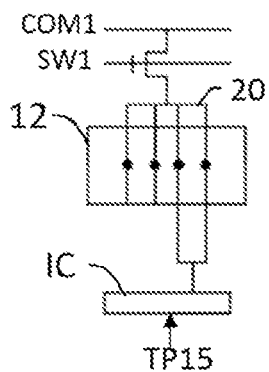
FIG. 5e is a schematic diagram of a fifth wiring method of the first embodiment of the touch trace electrically connected to the second touch electrode and the first common power line and the driver chip.
Figure 5F:
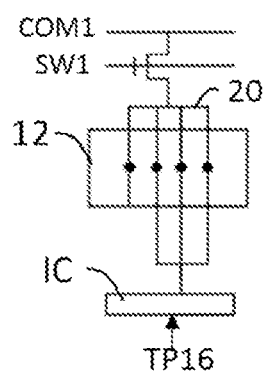
FIG. 5f is a schematic diagram of a sixth wiring method of the first embodiment of the touch trace electrically connected to the second touch electrode and the first common power line and the driver chip.

Regarding the six different wiring methods of the first embodiment shown in FIG. 5a to FIG. 5f: the number of the touch trace 20 electrically connected the second touch electrode 12 and the first common power line COM1 is two, and the number of the touch trace 20 electrically connected to the second touch electrode 12 and the driver chip IC is one in the first wiring method TP11 shown in FIG. 5a; the number of the touch trace 20 electrically connected to the second touch electrode 12 and the first common power line COM1 is three, and the number of the touch trace 20 electrically connected to the second touch electrodes 12 and the driver chip IC is one in the second wiring method TP12 shown in FIG. 5b; the number of the touch trace 20 electrically connected to the second touch electrode 12 and the first common power line COM1 is three, and the number of the touch trace 20 electrically connected to the second touch electrode 12 and the driver chip IC 20 is two in the third wiring method TP13 shown in FIG. 5c; the number of the touch trace 20 electrically connected to the second touch electrode 12 and the first common power line COM1 is four, and the number of the touch trace 20 electrically connected to the second touch electrode 12 and the driver chip IC is one in the fourth wiring method TP14 shown in FIG. 5d; the number of the touch trace 20 electrically connected to the second touch electrode 12 and the first common power line COM1 is four, and the number of the touch trace 20 electrically connected to the second touch electrode 12 and the driver chip IC is 2 in the fifth wiring method TP15 shown in FIG. 5e; the number of traces 20 electrically connected between the second touch electrode 12 and the first common power line COM1 is four, and the number of touch traces 20 electrically connected to the second touch electrode 12 and the driver chip IC is three in the sixth wiring method TP16 shown in FIG. 5f. In addition, it should be noted that wiring methods of the touch traces 10 electrically connected to the second touch electrode 12 and the first common power line COM1, and the second touch electrode 12 and the driver chip IC are not limited to the above six types, and can be adaptively expanded based on the same technical concept in practical applications.

Regarding the six different wiring methods of the second embodiment as shown in FIGS. 6a to 6f, a dummy trace 201 is disposed between the second touch electrode 12 and the driver chip IC, and one end of the dummy trace 201 is electrically connected to the second touch electrode 12. Specifically, the sum of the number of the dummy trace 201 and the number of the touch trace 20 electrically connected to the second touch electrode 12 and the driver chip IC is greater than the number of the touch trace 20 electrically connected to the first touch electrode 11 and the driver chip IC, and is less than or equal to the number of the touch trace electrically connected to the third touch electrode 13 and the driver chip IC. It should be noted that the dummy trace 201 is formed by disconnecting the touch trace provided between the second touch electrode 12 and the driver chip IC on a side close to the driver chip IC. Relative to the first embodiment shown in FIG. 5a to FIG. 5f, the present embodiment is beneficial to simplify the manufacturing process of the touch trace.

Figure 6A:
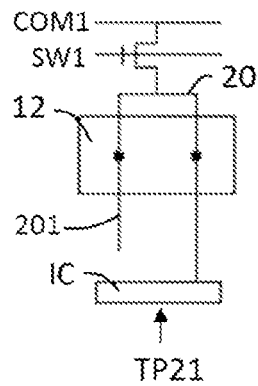
FIG. 6a is a schematic diagram of a first wiring method of a second embodiment of a touch trace electrically connected to the second touch electrode, the first common power line and the driver chip.
Figure 6B:
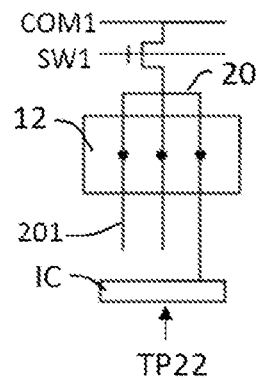
FIG. 6b is a schematic diagram of a second wiring method of the second embodiment of the touch trace electrically connected to the second touch electrode and the first common power line and the driver chip.
Figure 6C:
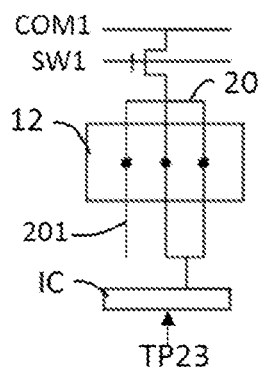
FIG. 6c is a schematic diagram of a third wiring method of the second embodiment of the touch trace electrically connected to the second touch electrode and the first common power line and the driver chip.
Figure 6D:
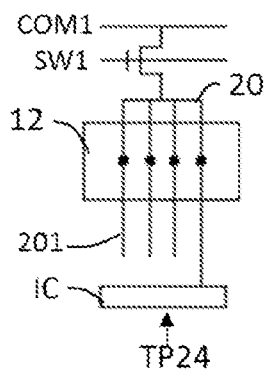
FIG. 6d is a schematic diagram of a fourth wiring method of the second embodiment of the touch trace electrically connected to the second touch electrode and the first common power line and the driver chip.
Figure 6E:
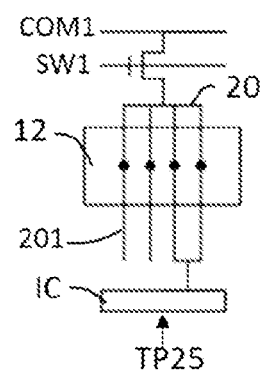
FIG. 6e is a schematic diagram of a fifth wiring method of the second embodiment of the touch trace electrically connected to the second touch electrode and the first common power line and the driver chip.
Figure 6F:
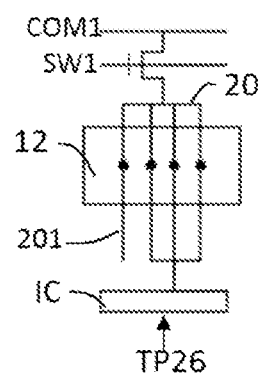
FIG. 6f is a schematic diagram of a sixth wiring manner of the second embodiment of the touch trace electrically connected to the second touch electrode and the first common power line and the driver chip.

The number of the touch trace 20 electrically connected the second touch electrode 12 and the first common power line COM1 is two, the number of the touch trace 20 electrically connected to the second touch electrode 12 and the driver chip IC is one, and the number of the dummy trace 201 is one in the first wiring method TP21 shown in FIG. 6a; the number of the touch trace 20 electrically connected to the second touch electrode 12 and the first common power line COM1 is three, the number of the touch trace 20 electrically connected to the second touch electrode 12 and the driver chip IC is one, and the number of the dummy trace 201 is two in the second wiring method TP22 shown in FIG. 6b; the number of the touch trace 20 electrically connected to the second touch electrode 12 and the first common power line COM1 is three, the number of the touch trace 20 electrically connected to the second touch electrode 12 and the driver chip IC 20 is two, and the number of the dummy trace 201 is two in the third wiring method TP23 shown in FIG. 6c; the number of the touch trace 20 electrically connected to the second touch electrode 12 and the first common power line COM1 is four, the number of the touch trace 20 electrically connected to the second touch electrode 12 and the driver chip IC is one, and the number of the dummy trace 201 is three in the fourth wiring method TP24 shown in FIG. 6d; the number of the touch trace 20 electrically connected to the second touch electrode 12 and the first common power line COM1 is four, the number of the touch trace 20 electrically connected to the second touch electrode 12 and the driver chip IC is two, and the number of the dummy trace 201 is two in the fifth wiring method TP25 shown in FIG. 6e; the number of traces 20 electrically connected between the second touch electrode 12 and the first common power line COM1 is four, the number of touch traces 20 electrically connected to the second touch electrode 12 and the driver chip IC is three, and the number of the dummy trace 201 is one in the sixth wiring method TP26 shown in FIG. 6f. In addition, it should be noted that wiring methods of the second embodiment of the touch traces 20 electrically connected to the second touch electrode 12 and the first common power line COM1, and the second touch electrode 12 and the driver chip IC are not limited to the above six types, and can be adaptively expanded based on the same technical concept in practical applications.

Regarding the six different wiring methods of the third embodiment as shown in FIGS. 7*a* to 7*f*, the touch electrode 20 further comprises a fourth touch electrode 14 disposed between the second touch electrode 12 and the driver chip IC along the first direction Y. A dummy trace 202 is disposed on the fourth touch electrode 14, and the dummy trace 202 is electrically connected to the fourth touch electrode 14. Specifically, the sum of the number of the dummy trace 202 and the number of the touch trace 20 electrically connected to the second touch electrode 12 and the driver chip IC is greater than the number of touch traces 20 electrically connected to the first touch electrode 11 and the driver chip IC, and is less than or equal to the number of touch traces 20 electrically connected to that third touch electrode 13 and the driver chip IC. Furthermore, the dummy trace 202 is arranged in a line segment on the fourth touch electrode 14 and is not connected to the adjacent touch electrode 20. It should be noted that the dummy trace 202 is made by disconnecting and soldering the touch trace disposed between the second touch electrode 12 and the driver chip IC.

Figure 7A:
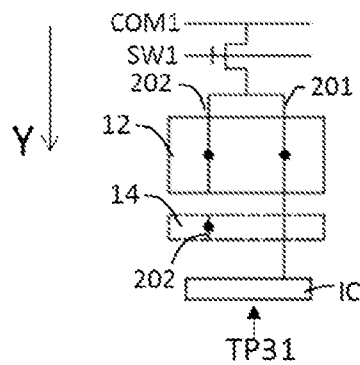
FIG. 7a is a schematic diagram of a first wiring manner of a third embodiment of a touch trace electrically connected to the second touch electrode and the first common power line and the driver chip.
Figure 7B:
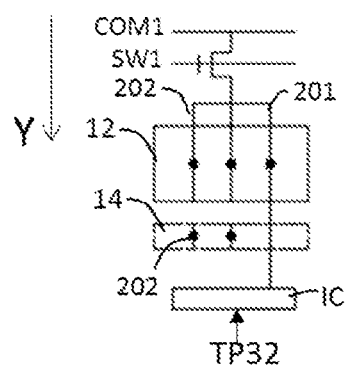
FIG. 7b is a schematic diagram of a second wiring manner of the third embodiment of a touch trace electrically connected to the second touch electrode and the first common power line and the driver chip.
Figure 7C:
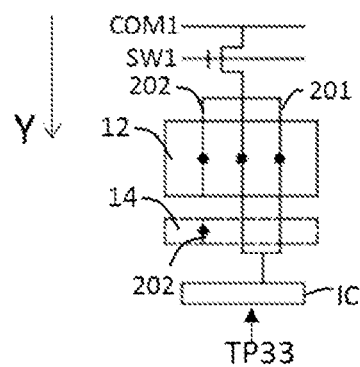
FIG. 7c is a schematic diagram of a third wiring method of the third embodiment of the touch trace electrically connected to the second touch electrode and the first common power line and the driver chip.
Figure 7D:
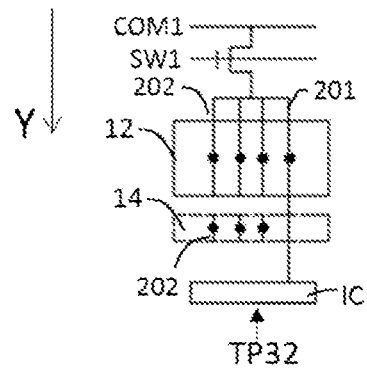
FIG. 7d is a schematic diagram of a fourth wiring manner of the third embodiment of the touch trace electrically connected to the second touch electrode and the first common power line and the driver chip.
Figure 7E:
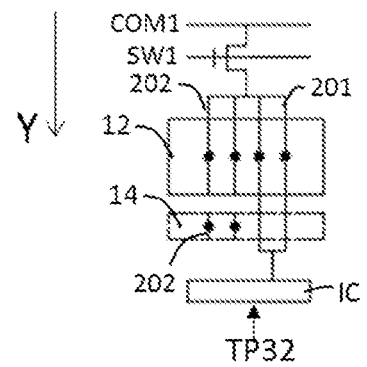
FIG. 7e is a schematic diagram of a fifth wiring method of the third embodiment of the touch trace electrically connected to the second touch electrode and the first common power line and the driver chip.
Figure 7F:
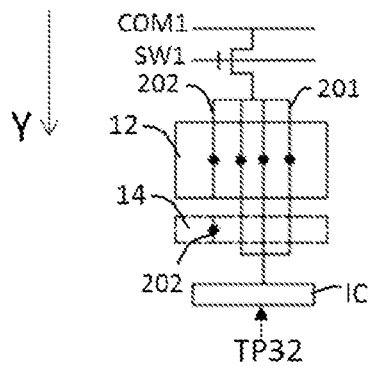
FIG. 7f is a schematic diagram of a sixth wiring method of the third embodiment of the touch trace electrically connected to the second touch electrode and the first common power line and the driver chip.

The number of the touch trace 20 electrically connected the second touch electrode 12 and the first common power line COM1 is two, the number of the touch trace 20 electrically connected to the second touch electrode 12 and the driver chip IC is one, and the number of the dummy trace 202 is one in the first wiring method TP31 shown in FIG. 7*a*; the number of the touch trace 20 electrically connected to the second touch electrode 12 and the first common power line COM1 is three, the number of the touch trace 20 electrically connected to the second touch electrode 12 and the driver chip IC is one, and the number of the dummy trace 202 is two in the second wiring method TP32 shown in FIG. 7*b*; the number of the touch trace 20 electrically connected to the second touch electrode 12 and the first common power line COM1 is three, the number of the touch trace 20 electrically connected to the second touch electrode 12 and the driver chip IC 20 is two, and the number of the dummy trace 202 is two in the third wiring method TP33 shown in FIG. 7*c*; the number of the touch trace 20 electrically connected to the second touch electrode 12 and the first common power line COM1 is four, the number of the touch trace 20 electrically connected to the second touch electrode 12 and the driver chip IC is one, and the number of the dummy trace 202 is three in the fourth wiring method TP34 shown in FIG. 7*d*; the number of the touch trace 20 electrically connected to the second touch electrode 12 and the first common power line COM1 is four, the number of the touch trace 20 electrically connected to the second touch electrode 12 and the driver chip IC is two, and the number of the dummy trace 202 is two in the fifth wiring method TP35 shown in FIG. 7*e*; the number of traces 20 electrically connected between the second touch electrode 12 and the first common power line COM1 is four, the number of touch traces 20 electrically connected to the second touch electrode 12 and the driver chip IC is three, and the number of the dummy trace 202 is one in the sixth wiring method TP36 shown in FIG. 7*f*. In addition, it should be noted that wiring methods of the third embodiment of the touch traces 20 electrically connected to the second touch electrode 12 and the first common power line COM1, and the second touch electrode 12 and the driver chip IC are not limited to the above six types, and can be adaptively expanded based on the same technical concept in practical applications.

Optionally, referring to FIGS. 3, 5*a* to 5*f*, 6*a* to 6*f*, and 7*a* to 7*f*, the first touch electrode 11 and the second touch electrode 12 are disposed and are adjacent along the first direction Y. The number of the touch trace 20 electrically connected to the second touch electrode 12 and the driver chip IC is equal to the number of the touch trace 20 electrically connected to the first touch electrode 11 and the driver chip IC, and the number of the touch trace 20 electrically connected to the second touch electrode 12 and the first common power line COM1 is greater than the number of the touch trace 20 electrically connected to the first touch electrode 11 and the first common power line COM1. Through the above arrangement, stepwise changes in the number of touch traces 20 connected to the adjacent first touch electrodes 11 and the second touch electrodes 12 can be realized, which is beneficial to the voltage distribution on the first touch electrodes 11 and the second touch electrode 12 to tend to be consistent, which effectively prevents a large sudden change in voltage.

Optionally, the second touch electrode 12 and the third touch electrode 13 are arranged adjacent to each other along the first direction Y. The number of the touch trace 20 electrically connected to the second touch electrode 12 and the driver chip IC is less than the number of the touch trace 20 electrically connected to the third touch electrode 13 and the driver chip IC. The number of the touch trace 20 electrically connected to the second touch electrode 12 and the first common power line COM1 is equal to the number of the touch trace 20 electrically connected to the third touch electrode 13 and the first common power line COM1. Through the above arrangement, a stepwise change in the number of touch traces 20 connected to the adjacent second touch electrode 12 and the third touch electrode 13 can be realized, which is beneficial for the second touch electrode 12 and the voltage distribution on the third touch electrode 13 to tend to be consistent, which effectively prevents a large sudden change in voltage.

Optionally, the first touch electrode 11, the second touch electrode 12, and the third touch electrode 13 are sequentially arranged adjacent to each other along the first direction Y in order. The number of the touch trace 20 electrically connected to the second touch electrode 12 and the driver chip IC is equal to the number of touch traces 20 electrically connected to the first touch electrode 11 and the driver chip IC, the number of the touch trace 20 electrically connected to the second touch electrode 12 and the first common power line COM1 is greater than the number of the touch trace 20 electrically connected to the first touch electrodes 11 and the first common power line COM1. The number of the touch trace 20 electrically connected to the second touch electrode 12 and the driver chip IC is less than the number of touch traces 20 electrically connected to the third touch electrode 13 and the driver chip IC, and the number of the touch traces 20 electrically connected to the second touch electrode 12 and the common power line COM1 is equal to the number of the touch trace 20 electrically connected to the third touch electrode 13 and the first common power line COM1. Through the above arrangement, stepwise changes in the number of touch traces 20 connected to the adjacent first touch electrodes 11, the second touch electrodes 12, and the third touch electrodes 13 can be realized, which is beneficial to the voltage distribution on the first touch electrode 11, the second touch electrode 12, and the third touch electrode 13 tending to be consistent, which effectively prevents a large sudden change in voltage.

More optionally, the number of the touch trace 20 electrically connected to the second touch electrode 12 and the first common power line COM1 is two, and the number of the touch trace 20 electrically connected to the driver chip IC is one. The number of the touch trace 20 electrically to the first touch electrode 11 and the first common power line COM1 and the number of the touch trace 20 electrically connected to the driver chip IC is 1. The number of the touch trace 20 electrically connected to the third touch electrode 13 and the first common power line COM1 and the number of the touch trace 20 electrically connected to the driver chip IC are both two. It should be understood that the wiring arrangement feature of the touch trace 20 of the present embodiment realizes that the number of the touch trace 20 connected to the first touch electrode 11, the second touch electrode 12, and the third touch electrode 13 is sequentially increased, causing gradual increases of the voltage on the first touch electrode 11, the second touch electrode 12, and the third touch electrode 13, which effectively prevents a large sudden change in voltage and makes the voltage distribution tend to be consistent.

Furthermore, optionally, the number of the touch trace 20 electrically connected to the second touch electrode 12 and the first common power line COM1 is four, and the number of the touch trace 20 electrically connected to the second touch electrode 12 and the driver chip IC is two. The number of the touch trace 20 electrically connected to the first touch electrode 11 and the first common power line COM1 and the number of the touch trace 20 electrically connected to the first touch electrode and the driver chip IC are two. The touch traces 20 electrically connected to the third touch electrode 13 and the first common power line COM1 and the number of the touch trace 20 and the number of the touch trace 20 electrically connected to the third touch electrode 13 the driver chip IC are both four. It should be understood that the wiring arrangement feature of the touch trace 20 of the present embodiment realizes that the number of the touch trace 20 connected to the first touch electrode 11, the second touch electrode 12, and the third touch electrode 13 is sequentially increased, causing gradual increases of the voltage on the first touch electrode 11, the second touch electrode 12, and the third touch electrode 13, which effectively prevents a large sudden change in voltage and makes the voltage distribution tend to be consistent.

According to an embodiment of the present application, referring to FIGS. 4, 5a to 5f, 6a to 6f, and 7a to 7f, the number of the touch trace 20 electrically connected to the second touch electrode 12 and the driver chip IC is less than the number of the touch trace 20 electrically connected to the first touch electrode 11 and the driver chip IC, and the number of the touch trace 20 electrically connected to the second touch electrode 12 and the driver chip IC is greater than or equal to the number of the touch trace 20 electrically connected the third touch electrode 13 and the driver chip IC. It should be noted that the driver chip IC transmits voltage signals and performs signal collection and analysis to the touch electrode 10 through the touch traces 20, and the number of the touch trace 20 electrically connected to the touch electrode 10 and the driver chip IC directly affects the voltage state on the touch electrode 10. In actual production, considering the number of channels of the driver chip IC and the resolution rate of the display panel, the number of touch traces connecting different touch electrodes may be different. In the present embodiment, through rationally config-uring the number of touch traces that are electrically connected to the touch electrode and the driver chip, stepwise changes are realized in the number of touch traces 20 connected to the first touch electrode 11, the second touch electrode 12, and the third touch electrode 13, thereby preventing sudden changes in the number of touch traces connected to different touch electrodes, which will seriously damage the consistency of the voltage distribution on the touch electrodes and the common electrode. The present embodiment is beneficial to promote the voltage distribution on the touch electrode and the common electrode in the thin film transistor array substrate to be consistent.

Further, the number of the touch trace 20 electrically connected to the second touch electrode 12 and the first common power line COM1 is less than or equal to the number of the touch trace 20 electrically connected to the first touch electrode 11 and the first common power line COM1, and the number of the touch trace 20 electrically connected to the second touch electrode 12 and the first common power line COM1 is greater than the number of the touch trace 20 electrically connected to the third touch electrode 13 and the first common power line COM1. It should be noted that the number of the touch traces 20 electrically connected to the touch electrode 10 and the first common power line COM1 directly affects the voltage state on the touch electrode 10. In the present embodiment, through rationally configuring the number of touch traces that are electrically connected to the touch electrode and the first common power line, stepwise changes are realized in the number of touch traces 20 connected to the first touch electrode 11, the second touch electrode 12, and the third touch electrode 13, thereby preventing sudden changes in the number of touch traces connected to different touch electrodes, and the voltage distribution on the touch electrode and the common electrode in the thin film transistor array substrate tends to be consistent.

It should be noted that, regarding wiring methods of the touch traces 20 electrically connected to the second touch electrode 12 and the first common power line COM1, and the second touch electrode 12 and the driver chip IC, the present embodiment provides six different wiring methods of the first embodiment shown in FIGS. 5a to 5f, six different wiring methods of the second embodiment shown in FIGS. 6a to 6f, and six different wiring methods of the third embodiment as shown in FIG. 7a to FIG. 7f. During operations, one or more of the eighteen different wiring methods in the three embodiments can be flexibly applied.

Regarding the six different wiring methods of the second embodiment as shown in FIGS. 6a to 6f, the sum of the number of the dummy trace 201 and the number of the touch trace 20 electrically connected to the second touch electrode 12 and the driver chip IC is less than or equal to the number of the touch trace 20 electrically connected to the first touch electrode 11 and the driver chip IC, and is greater than the number of the touch trace electrically connected to the third touch electrode 13 and the driver chip IC. Regarding the six different wiring methods of the third embodiment as shown in FIGS. 7a to 7f, the sum of the number of the dummy trace 202 and the number of the touch trace 20 electrically connected to the second touch electrode 12 and the driver chip IC is less than or equal to the number of touch trace 20 electrically connected to the first touch electrode 11 and the driver chip IC, and is greater than the number of touch trace 20 electrically connected to that third touch electrode 13 and the driver chip IC.

It should be noted that, the wiring methods of the touch trace 20 electrically connected to the second touch electrode 12 and the first common power line COM1, and the second touch electrode 12 and the driver chip IC is not limited the above eighteen different wiring methods. In practical applications, it can be adaptively expanded based on the same technical idea.

Optionally, referring to FIGS. 4, 5a to 5f, 6a to 6f, and 7a to 7f, the first touch electrode 11 and the second touch electrode 12 are disposed and are adjacent along the first direction Y. The number of the touch trace 20 electrically connected to the second touch electrode 12 and the driver chip IC is less than the number of the touch trace 20 electrically connected to the first touch electrode 11 and the driver chip IC, and the number of the touch trace 20 electrically connected to the second touch electrode 12 and the first common power line COM1 is equal to the number of the touch trace 20 electrically connected to the first touch electrode 11 and the first common power line COM1. Through the above arrangement, stepwise changes in the number of touch trace 20 connected to the adjacent first touch electrode 11 and the second touch electrode 12 can be realized, which is beneficial to the voltage distribution on the first touch electrode 11 and the second touch electrode 12 to tend to be consistent, which effectively prevents a large sudden change in voltage.

Optionally, the second touch electrode 12 and the third touch electrode 13 are arranged adjacent to each other along the first direction Y. The number of the touch trace 20 electrically connected to the second touch electrode 12 and the driver chip IC is equal to that between the third touch electrode 13 and the driver chip IC, and the number of the touch trace 20 electrically connected to the second touch electrode 12 and the first common power line COM1 is greater than the number of the touch trace 20 electrically connected to the third touch electrode 13 and the first common power line COM1. Through the above arrangement, a stepwise change in the number of touch trace 20 connected to the adjacent second touch electrode 12 and the third touch electrode 13 can be realized, which is beneficial to the second touch electrode 12 and the voltage distribution on the third touch electrode 13 to tend to be consistent, which effectively prevents a large sudden change in voltage.

Optionally, the first touch electrode 11, the second touch electrode 12, and the third touch electrode 13 are sequentially arranged adjacent to each other along the first direction Y. The number of the touch trace 20 electrically connected to the second touch electrode 12 and the driver chip IC is less than the number of touch trace 20 electrically connected to the first touch electrode 11 and the driver chip IC, the number of the touch trace 20 electrically connected to the second touch electrode 12 and the first common power line COM1 is equal to the number of the touch trace 20 electrically connected to the first touch electrodes 11 and the first common power line COM1. The number of the touch trace 20 electrically connected to the second touch electrode 12 and the driver chip IC is equal to the number of touch trace 20 electrically connected to the third touch electrode 13 and the driver chip IC, and number of the touch trace 20 electrically connected to the second touch electrode 12 and the common power line COM1 is greater than the number of the touch trace 20 electrically connected to the third touch electrode 13 and the first common power line COM1. Through the above arrangement, stepwise changes in the number of touch trace 20 connected to the adjacent first touch electrodes 11, the second touch electrodes 12, and the third touch electrodes 13 can be realized, which is beneficial to the voltage distribution on the first touch electrode 11, the second touch electrode 12, and the third touch electrode 13 to tend to be consistent, which effectively prevents a large sudden change in voltage.

Figure 8:
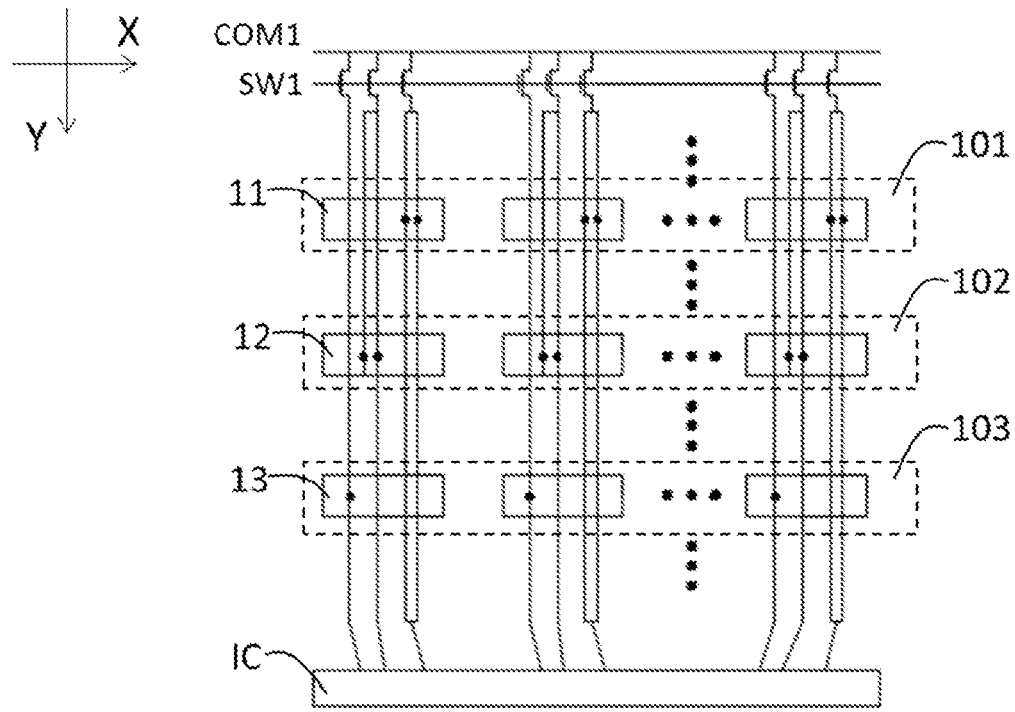
FIG. 8 is a schematic diagram of a third wiring method of the touch trace electrically connected to the touch electrode and the first common power line and the driver chip provided by an embodiment of the present application.

Furthermore, referring to FIG. 4 and FIG. 8, the touch electrodes side by side with the first touch electrodes 11 define a first matrix 101, the touch electrode side by side with the second touch electrodes 12 define a second matrix 102, and the touch electrodes side by side with the third touch electrodes 13 define a third matrix 103 along the second direction X. At least part of the touch electrodes in the first matrix 101 and the touch electrode 11 has the same touch wiring characteristics, at least part of the touch electrodes in the second matrix 102 and the second touch electrode 12 have the same touch wiring characteristics, and at least part of the touch electrodes in the third matrix 103 and the third touch electrode 13 have the same touch wiring characteristics. Refer to the above-mentioned embodiments regarding the touch wiring characteristics of the touch electrodes in each matrix, which will not be repeated here.

More optionally, referring to FIGS. 4, 5a to 5f, 6a to 6f, and 7a to 7f, the number of the touch trace 20 electrically connected to the second touch electrode 12 and the first common power line COM1 is four, and the number of the touch trace 20 electrically connected to the driver chip IC is two. The number of the touch trace 20 electrically to the first touch electrode 11 and the first common power line COM1 and the number of the touch trace 20 electrically connected to the driver chip IC are both four. The number of the touch trace 20 electrically connected to the third touch electrode 13 and the first common power line COM1 and the number of the touch trace 20 electrically connected to the driver chip IC are both two. It should be understood that the wiring arrangement feature of the touch trace 20 of the present embodiment realizes that the number of the touch trace 20 connected to the first touch electrode 11, the second touch electrode 12, and the third touch electrode 13 is sequentially decreased, causing gradual decreases of the voltage on the first touch electrode 11, the second touch electrode 12, and the third touch electrode 13, which effectively prevents a large sudden change in voltage and makes the voltage distribution tend to be consistent.

Figure 9:
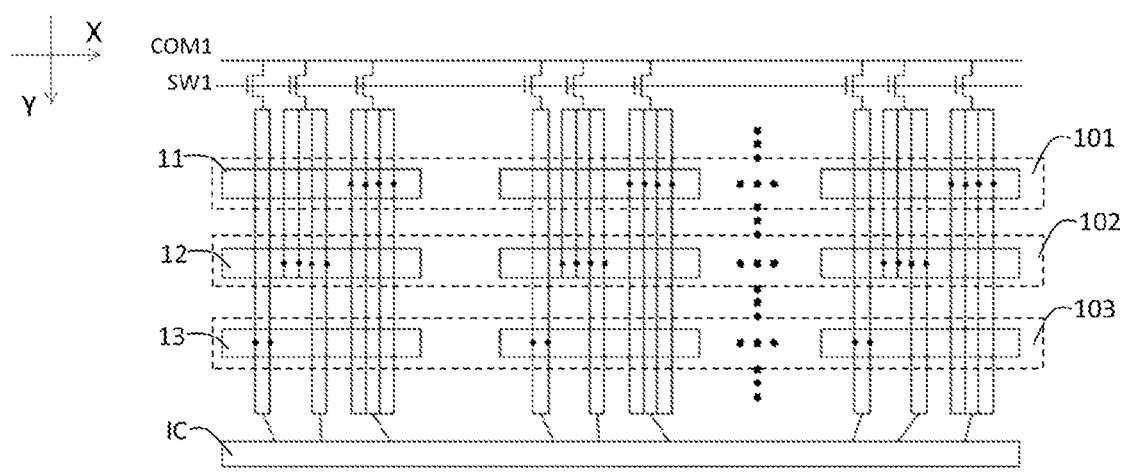
FIG. 9 is a schematic diagram of a fourth wiring method of the touch trace electrically connected to the touch electrode and the first common power line and the driver chip provided by an embodiment of the present application.

Furthermore, referring to FIG. 4 and FIG. 9, the touch electrodes side by side with the first touch electrodes 11 define a first matrix 101, the touch electrode side by side with the second touch electrodes 12 define a second matrix 102, and the touch electrodes side by side with the third touch electrodes 13 define a third matrix 103 along the second direction X. At least part of the touch electrodes in the first matrix 101 and the touch electrode 11 has the same touch wiring characteristics, at least part of the touch electrodes in the second matrix 102 and the second touch electrode 12 have the same touch wiring characteristics, and at least part of the touch electrodes in the third matrix 103 and the third touch electrode 13 have the same touch wiring characteristics. Refer to the above-mentioned embodiments regarding the touch wiring characteristics of the touch electrodes in each matrix, which will not be repeated here.

Figure 10:
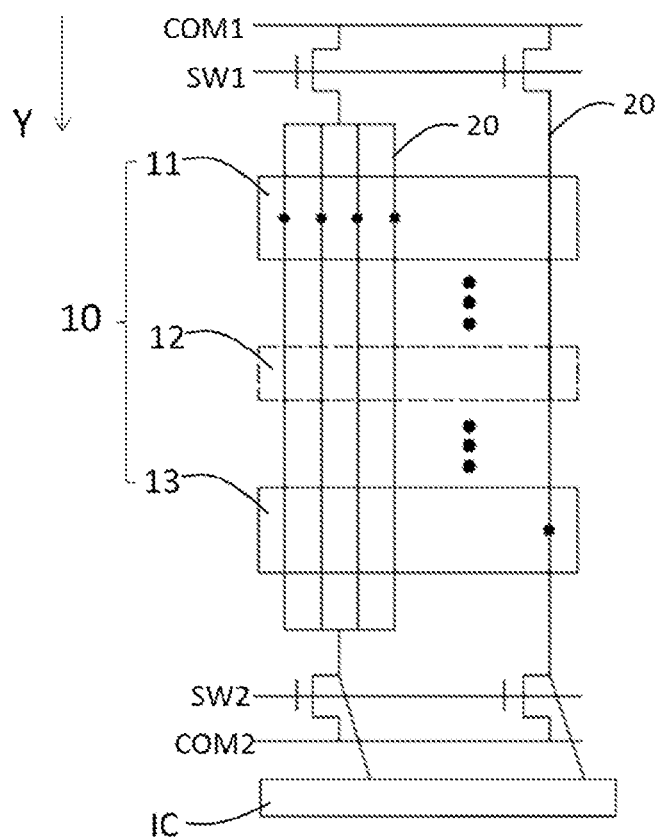
FIG. 10 is a schematic diagram of a wiring method of the touch trace electrically connecting the touch electrode with the first common power line, the second common power line, and the driver chip provided by an embodiment of the present application.

Optionally, as shown in FIGS. 2 and 10, the first common power line COM1 and the driver chip IC are respectively disposed corresponding to the non-display area NA, and are disposed on opposite ends of the touch function layer 03 along the first direction Y. Further, a second common power line COM2 is also provided on the same side of the driver chip IC, and the second common power line COM2 is electrically connected to the touch electrode 10 through the touch trace 20, In addition, the second common power line COM2 and the driving chip IC are connected to the same touch trace 20. Optionally, the touch trace 20 is electrically connected to the second common power line COM2 and the touch electrode 10 through a second switch transistor SW2, and the second switch transistor SW2 is configured to control the electrical conduction state between the second common power line COM2 and the touch electrode 10. It should be noted that the first common power line COM1 and the second common power line COM2 respectively provide voltages to the touch electrodes 10 from both ends of the touch function layer 03, which can promote voltage equalization on different touch electrodes 10.

In summary, embodiments of the present application provide a thin film transistor array substrate including a plurality of touch electrodes, and each of the touch electrodes is electrically connected to the first common power line and the driver chip through a touch trace. The number of touch traces that are electrically connected to the touch electrode and the driver chip is reasonably configured to eliminate or reduce the difference in the number of touch trace connected to the first common power line and the driver chip on different touch electrodes. The generated voltage mutation makes the voltage on the touch electrode and the common electrode in the thin film transistor array substrate tend to be consistent, thereby improving the quality of the display screen.

An embodiment of the present application also provides a touch display panel, which includes the thin film transistor array substrate provided in the above embodiments. The touch display panel may be a liquid crystal display panel, and thus further includes a color filter substrate disposed opposite to the thin film transistor array substrate, and liquid crystals disposed between the thin film transistor array substrate and the color filter substrate. The touch display panel solves the problem of poor voltage uniformity of the common electrode caused by the sudden change in the number of touch trace connected to different touch electrodes, and can realize high-quality and balanced display.

The above is a detailed introduction to a mobile terminal provided by an embodiment of the present application. Specific examples are used in this article to illustrate the principles and implementation of the present application. Its core idea, at the same time, for those skilled in the art, according to the idea of this application, there will be changes in the specific implementation and scope of application. In summary, the content of this specification should not be construed as a limitation to this application.

What is claimed is:

1. A thin film transistor array substrate, comprising:
a substrate comprising a non-display area;
a thin film transistor array layer disposed on the substrate; and
a touch function layer disposed in the thin film transistor array layer, comprising a plurality of touch electrodes, wherein each of the touch electrodes is electrically connected to a first common power line and a driver chip through at least one touch trace;
wherein the plurality of touch electrodes comprise a first touch electrode, a second touch electrode, and a third touch electrode arranged along a first direction, a fourth touch electrode disposed between the second touch electrode and the driver chip along the first direction, and a dummy trace disposed on and electrically connected to the fourth touch electrode, the number of the touch trace electrically connected to the second touch electrode and the driver chip is greater than or equal to the number of the touch trace electrically connected to the first touch electrode and the number of the touch trace electrically connected to the second touch electrode and the driver chip is less than the number of the touch trace electrically connected to the third touch electrode and the driver chip; or
the number of the touch trace electrically connected to the second touch electrode and the driver chip is less than the number of the touch trace electrically connected to the first touch electrode and the driver chip, and the number of the touch trace electrically connected to the second touch electrode and the driver chip is greater than or equal to the number of the touch trace electrically connected to the third touch electrode and the driver chip.

2. The thin film transistor array substrate of claim 1, wherein a sum of the number of the dummy trace disposed on the fourth touch electrode and the number of the touch trace electrically connected to the second touch electrode and the driver chip is greater than the number of the touch trace electrically connected to the first touch electrode and the driver chip, and is less than or equal to the number of the touch trace electrically connected to the third touch electrode and the driver chip; or
the sum of the number of the dummy trace disposed on the fourth touch electrode and the number of the touch trace electrically connected to the second touch electrode and the driver chip is less than or equal to the number of the touch trace electrically connected to the first touch electrode and the driver chip, and is greater than the number of the touch trace electrically connected to the third touch electrode and the driver chip.

3. A touch display panel, comprising the thin film transistor array substrate of claim 1.

4. The touch display panel of claim 3, further comprising a color filter substrate disposed opposite to the thin film transistor array substrate, and liquid crystals disposed between the color filter substrate and the thin film transistor array substrate.

5. A thin film transistor array substrate, comprising:
a substrate comprising a non-display area;
a thin film transistor array layer disposed on the substrate; and
a touch function layer disposed in the thin film transistor array layer, comprising a plurality of touch electrodes, wherein each of the touch electrodes is electrically connected to a first common power line and a driver chip through at least one touch trace;
wherein the plurality of touch electrodes comprise a first touch electrode, a second touch electrode, and a third touch electrode arranged along a first direction,
the number of the touch trace electrically connected to the second touch electrode and the driver chip is greater than or equal to the number of the touch trace electrically connected to the first touch electrode and the driver chip, and the number of the touch trace electrically connected to the second touch electrode and the driver chip is less than the number of the touch trace electrically connected to the third touch electrode and the driver chip; or
the number of the touch trace electrically connected to the second touch electrode and the driver chip is less than the number of the touch trace electrically connected to the first touch electrode and the driver chip, and the number of the touch trace electrically connected to the second touch electrode and the driver chip is greater than or equal to the number of the touch trace electrically connected to the third touch electrode and the driver chip;

and wherein a dummy trace is disposed between the second touch electrode and the driver chip, and one end of the dummy trace is electrically connected to the second touch electrode;

a sum of the number of the dummy trace and the number of the touch trace electrically connected to the second touch electrode and the driver chip is greater than the number of the touch trace electrically connected to the first touch electrode and the driver chip, and is less than or equal to the number of the touch trace electrically connected to the third touch electrode and the driver chip; or the sum of the number of the dummy trace and the number of the touch trace electrically connected to the second touch electrode and the driver chip is less than or equal to the number of the touch trace electrically connected to the first touch electrode and the driver chip, and is greater than the number of the touch trace electrically connected to the third touch electrode and the driver chip.

6. A touch display panel, comprising the thin film transistor array substrate of claim 5, a color filter substrate disposed opposite to the thin film transistor array substrate, and liquid crystals disposed between the thin film transistor array substrate and the color filter substrate.

\* \* \* \* \*